US009992205B2

(12) United States Patent
Dasari et al.

(10) Patent No.: US 9,992,205 B2
(45) Date of Patent: Jun. 5, 2018

(54) SYSTEMS AND METHODS FOR PERFORMING OPERATIONS ON A COMPUTING DEVICE

(71) Applicant: Lenovo Enterprise Solutions (Singapore) Pte. Ltd., New Tech Park (SG)

(72) Inventors: Shiva R. Dasari, Austin, TX (US); William L. Jaeger, Pittsboro, NC (US); Sumeet Kochar, Cary, NC (US); Doug Oliver, Round Rock, TX (US); William B. Schwartz, Raleigh, NC (US)

(73) Assignee: LENOVO ENTERPRISE SOLUTIONS (SINGAPORE) PTE. LTD., New Tech Park (SG)

( * ) Notice: Subject to any disclaimer, the term of this patent is extended or adjusted under 35 U.S.C. 154(b) by 15 days.

(21) Appl. No.: 14/727,900

(22) Filed: Jun. 2, 2015

(65) Prior Publication Data

US 2016/0359860 A1 Dec. 8, 2016

(51) Int. Cl.
G06F 7/04 (2006.01)
G06F 15/16 (2006.01)
G06F 17/30 (2006.01)
H04L 29/06 (2006.01)
H04L 29/08 (2006.01)
H04W 4/00 (2018.01)

(52) U.S. Cl.
CPC .......... *H04L 63/102* (2013.01); *H04L 67/141* (2013.01); *H04W 4/008* (2013.01)

(58) Field of Classification Search
CPC ............... H04L 67/141; H04L 41/5051; H04L 63/0492; H04L 63/102; H04W 4/008
See application file for complete search history.

(56) References Cited

U.S. PATENT DOCUMENTS

| | | | | |
|---|---|---|---|---|
| 2003/0056131 | A1* | 3/2003 | Eberhard | G06F 1/3203 713/320 |
| 2006/0236097 | A1* | 10/2006 | Prologo | H04L 63/0823 713/156 |
| 2008/0022123 | A1* | 1/2008 | Yoneda | G06Q 20/341 713/185 |
| 2012/0258726 | A1* | 10/2012 | Bansal | H04M 1/72563 455/456.1 |
| 2013/0141744 | A1* | 6/2013 | Saito | H04N 1/4426 358/1.13 |

(Continued)

*Primary Examiner* — Trong Nguyen
(74) *Attorney, Agent, or Firm* — Olive Law Group, PLLC

(57) ABSTRACT

Methods and systems for performing one or more operations on a first computing device are disclosed. A method includes receiving, from a second computing device via a short-range wireless communication, a service session setup request and an identifier of one of the second computing device and an associated user of the second computing device. The method further includes determining whether to authorize the service session setup request based on the identifier. Then in response to determining to authorize the service session setup request, a service session may be established between the first and the second computing devices. The method also includes receiving one or more service instructions that are allowable based on the identifier. The method furthermore includes performing, at the first computing device, the one or more operations based on the service instructions.

17 Claims, 12 Drawing Sheets

(56) References Cited

U.S. PATENT DOCUMENTS

2014/0068717 A1* 3/2014 Mayes .................... G06F 21/33
                                                        726/3
2016/0142862 A1* 5/2016 Coenen ................. H04W 4/008
                                                      455/41.1

* cited by examiner

SYSTEMS AND METHODS FOR PERFORMING OPERATIONS ON A COMPUTING DEVICE

TECHNICAL FIELD

The presently disclosed subject matter generally relates to computing devices. More particularly, the presently disclosed subject matter relates to systems and methods for performing one or more operations on a computing device.

BACKGROUND

Typically, in a common x86 personal computer (PC) or other computing device there are multiple jumpers located on the system board or motherboard, which may be used for service personnel. In a computer, a jumper may refer to a pair of prongs that are electrical contact points set into the computer motherboard or an adapter card. For setting up a jumper, a plug may be placed on the prongs that may complete a contact. In effect, the jumper may act as a switch by closing (or opening) an electrical circuit. Further, jumpers can be added or removed to change the function or performance of a PC component. In one particular scenario, the jumper can be used to recover a corrupted Unified Extensible Firmware Interface (UEFI) image or Basic Input Output System (BIOS) image on the planar. This may require a service technician to un-cable a server, remove the server from a rack, open and change the jumper position. Performing this action may be costly in terms of both service cost time and downtime for a customer.

One solution utilizes a physical jumper located on the inside of the server or computing device to provide this function. The customer or technician may have to open the cover (possibly by removing the server from rack or removing cables from the server) to move the jumper, perform the recovery and then restore the jumper, re-cable and replace the system in the rack if needed.

Another solution is to utilize a remote application using a chassis manager, such as a Baseboard Management Controller (BMC). A software technique may be used to provide the recovery mechanism; however, one drawback to this solution would be that it might be impossible for a service technician to do this while in front of the chassis if he/she does not have management network access or proper credentials for accessing the server or the computer.

In view of the foregoing, there is a need for improved systems and techniques for implementing operations on computing devices.

SUMMARY

In accordance with embodiments, the present disclosure provides a method for performing one or more operation on a first computing device. The method includes receiving, from a second computing device via a short-range wireless communication, a service session setup request and an identifier of the second computing device or an associated user of the second computing device. The first computing device may be a server, and the second computing device may be a mobile phone or device. The method may further include determining whether to authorize the service session setup request based on the identifier. In an exemplary scenario, the first computing device may authorize the user and/or the second computing device based on a digital certificate service. Subsequently, in response to determining to authorize the service session setup request, a service session may be established between the first computing device and the second computing device. The method may also include receiving one or more service instructions that are allowable based on the identifier. The method may furthermore include performing, at the first computing device, the one or more operations based on the one or more service instructions.

In accordance with other embodiments of the present disclosure, a system is provided for performing an operation on a first computing device. The system includes a wireless communication device configured to receive, from a second computing device via a short-range wireless communication, a service session setup request and an identifier of one of the second computing device, and an associated user of the second computing device. The system may also include an operations manager configured to determine whether to authorize the service session setup request based on the identifier. Further, in response to determining to authorize the service session setup request, the operations manager may be configured to establish a service session between the first computing device and the second computing device. The operations manager may also be configured to receive one or more service instructions that are allowable based on the identifier. The operations manager may also be configured to perform, at the first computing device, one or more operations based on the one or more service instructions.

BRIEF DESCRIPTION OF THE DRAWINGS

The illustrated embodiments of the disclosed subject matter will be best understood by reference to the drawings, wherein like parts are designated by like numerals throughout. The following description is intended only by way of example, and simply illustrates certain selected embodiments of devices, systems, and processes that are consistent with the disclosed subject matter as claimed herein.

DETAILED DESCRIPTION

Figure 1:
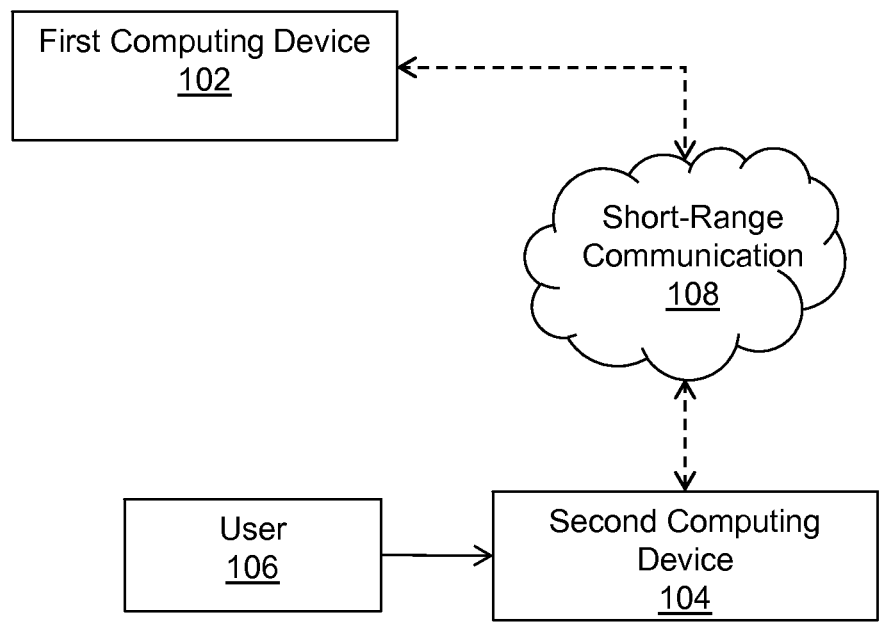
FIG. 1 is a block diagram of an example environment in which various embodiments of the present disclosure may function.

The following detailed description is made with reference to the figures. Exemplary embodiments are described to illustrate the disclosure, not to limit its scope, which is defined by the claims. Those of ordinary skill in the art will recognize a number of equivalent variations in the description that follows.

The present disclosure provides methods and systems for performing operations on a computing device via a short-range communication from another computing device. In an example, a computing device, such as a server or a personal computer, may have an NFC device (or an NFC reader) located on the front of the chassis (bezel or front panel connector). The NFC device may be attached to a service processor, such as a Baseboard Management Controller (BMC). In some embodiments, one or more second computing devices, such as mobile device, NFC service tags, and the like, and their associated users may be authorized and stored in a memory or database owned by the BMC. Physically these service tags may be part of a badge, mobile device, or the like of a user and can be easily carried by the user, such as a service technician.

It should be understood that the present disclosure describes settings and other various data as being stored in memory and this should not be considered limiting. For example, storage may be in any suitable memory such as disk, flash, etc.

In an example, a front panel service button or other user interface may be used to trigger a firmware recovery option; however, would not be authorized until an authorized NFC tag is presented at the NFC device. Once presented, the BMC may perform an operation, such as a service flash recovery, and the service technician may not be required to remove the computing device, i.e. the server, from the rack.

The present disclosure finds particular application in x86 personal computer or server, and will be described with particular reference thereto. However, it is to be appreciated that the present disclosure is also amenable to other like applications and computing devices.

The functional units described in this specification have been labeled as computing devices, or simply devices. A computing device may be implemented in programmable hardware devices such as processors, digital signal processors, central processing units, field programmable gate arrays, programmable array logic, programmable logic devices, cloud processing systems, or the like. The computing devices may also be implemented in software for execution by various types of processors. An identified computing device may include executable code and may, for example, include one or more physical or logical blocks of computer instructions, which may, for example, be organized as an object, procedure, function, or other construct. Nevertheless, the executables of an identified device need not be physically located together, but may comprise disparate instructions stored in different locations which, when joined logically together, comprise the device and achieve the stated purpose of the device.

Indeed, an executable code of a device could be a single instruction, or many instructions, and may even be distributed over several different code segments, among different applications, and across several memory devices. Similarly, operational data may be identified and illustrated herein within the device, and may be embodied in any suitable form and organized within any suitable type of data structure. The operational data may be collected as a single data set, or may be distributed over different locations including over different storage devices, and may exist, at least partially, as electronic signals on a system or network.

Furthermore, the described features, structures, or characteristics may be combined in any suitable manner in one or more embodiments. In the following description, numerous specific details are provided, to provide a thorough understanding of embodiments of the disclosed subject matter. One skilled in the relevant art will recognize, however, that the disclosed subject matter can be practiced without one or more of the specific details, or with other methods, components, materials, or the like. In other examples, well-known structures, materials, or operations are not shown or described in detail to avoid obscuring aspects of the disclosed subject matter.

As used herein, a "computing device" includes a single device capable of communicating, and exchanging one or messages with other devices present in a network. The computing device is also configured to connect to the network such as the Internet. Further, the computing device may include hardware, software, firmware, or combinations thereof. Examples of the computing device may include, but are not limited to, a mobile phone, a smart phone, a server, a personal computer, a laptop, a tablet computer, and the like.

As used herein, a "user interface" can include an interface on a computing device enabling a user to interact with the computing device. Example user interfaces include, but are not limited to, a keyboard, a display (e.g., touchscreen display), a mouse, and the like.

As used herein, an "x86" refers to a family of backward compatible instruction set architectures that are based on Intel 8086 central processing unit (CPU). Although x86 servers and architectures are described in examples provided herein, it is noted that the present disclosure may be similarly applied to other suitable systems including, but not limited to, derivatives of the x86 architecture.

Further, as used herein, a "jumper" may refer to a shot length of conductor that may be used to close a break in or open, or bypass part of, an electrical circuit on a motherboard of computer or server. The jumper may include a pair of prongs that can be electrical contact points set into the computer motherboard or an adapter card.

It is noted that although reference is made throughout to jumpers, it should be understood that application to jumpers as described herein may also be similarly and suitably applied to dual inline packages (DIPs).

As used herein, a "Unified Extensible Firmware Interface" (UEFI) refers to a specification for a software program that can connect a computer's firmware to an operating system (OS) of the computer.

As used herein, a "Baseboard Management Controller" (BMC) is a processor that may monitor the physical state of a computer, network server, or other higher device using sensors. The BMC is an embedded systems management controller that may support an Intelligent Platform Management Interface (IPMI). The sensors of the BMC can measure internal physical variables such as temperature, humidity, power-supply voltage, fan speeds, communications parameters, functions of the OS, and the like.

Further, as used herein, a "Near Field Communication" (NFC) refers to radio communication techniques that can allow computing devices, such as smartphones, to communicate with each other by either touching them or bringing the devices into proximity. Example distance ranges for NFC is about 10 cm.

As used herein, a "privilege level" of a user may define an access control for the user on the at least one computing system for performing operations on the computing device. Different operations may be permitted depending on a privilege level associate with a user or computing device utilized by a user.

The device or system for performing one or more operations on a computing device may be a software, hardware, firmware, or combination of these. The device or the system is further intended to include or otherwise cover all software or computer programs capable of performing the various heretofore-disclosed determinations, calculations, etc., for the disclosed purposes. For example, exemplary embodiments are intended to cover all software or computer programs capable of enabling processors to implement the disclosed processes. Exemplary embodiments are also intended to cover any and all currently known, related art or later developed non-transitory recording or storage mediums (such as a CD-ROM, DVD-ROM, hard drive, RAM, ROM, floppy disc, magnetic tape cassette, etc.) that record or store such software or computer programs. Exemplary embodiments are further intended to cover such software, computer programs, systems and/or processes provided through any other currently known, related art, or later developed medium (such as transitory mediums, carrier waves, etc.), usable for implementing the exemplary operations disclosed below.

In accordance with the exemplary embodiments, the disclosed computer programs can be executed in many exemplary ways, such as an application that is resident in the memory of a device or as a hosted application that is being executed on a server and communicating with the device application or browser via a number of standard protocols, such as TCP/IP, HTTP, XML, SOAP, REST, JSON and other sufficient protocols. The disclosed computer programs can be written in exemplary programming languages that execute from memory on the device or from a hosted server, such as BASIC, COBOL, C, C++, Java, Pascal, or scripting languages such as JavaScript, Python, Ruby, PHP, Perl or other sufficient programming languages.

Some of the disclosed embodiments include or otherwise involve data transfer over a network, such as communicating various inputs or files over the network. The network may include, for example, one or more of the Internet, Wide Area Networks (WANs), Local Area Networks (LANs), analog or digital wired and wireless telephone networks (e.g., a PSTN, Integrated Services Digital Network (ISDN), a cellular network, and Digital Subscriber Line (xDSL)), radio, television, cable, satellite, and/or any other delivery or tunneling mechanism for carrying data. The network may include multiple networks or sub networks, each of which may include, for example, a wired or wireless data pathway. The network may include a circuit-switched voice network, a packet-switched data network, or any other network able to carry electronic communications. For example, the network may include networks based on the Internet protocol (IP) or asynchronous transfer mode (ATM), and may support voice using, for example, VoIP, Voice-over-ATM, or other comparable protocols used for voice data communications. In one implementation, the network includes a cellular telephone network configured to enable exchange of text or SMS messages.

Examples of the network include, but are not limited to, a personal area network (PAN), a storage area network (SAN), a home area network (HAN), a campus area network (CAN), a local area network (LAN), a wide area network (WAN), a metropolitan area network (MAN), a virtual private network (VPN), an enterprise private network (EPN), Internet, a global area network (GAN), NFC network, and the like.

The present disclosure provides methods and systems for performing one or more operations on a first computing device. This first computing device can be a server, a personal computer (PC), or the like. A user can initiate a request via an application installed on another computing device operated by the user to setup a service session with the first computing device. The first computing device may authenticate the second computing device and/or the user based on an identifier of the second computing device and the user. Post authentication of the second computing device, the first computing device may share platform hardware signal information for displaying one or more operation actions at the second computing device. The displayed operation actions may vary depending on a privilege level of the user. The user can select one or more operation actions and may enter one or more service instructions at a user interface of the second computing device. Based on the one or more instructions, one or more operations may be performed at the first computing device.

FIG. 1 illustrates a block diagram illustrating an example environment 100 in which various embodiments of the present disclosure may function. The environment 100 may primarily include a first computing device 102, a second computing device 104, and an associated user 106 of the second computing device 104. The first computing device 102 and the second computing device 104 can communicate with each other via short-range communication technology 108. Examples of the short-range communication technology 108 include, but are not limited to, BLUETOOTH®, NFC, and the like. Further, the first computing device 102 can detect and establish a communication session with the second computing device 104 via the short-range communication 108.

In some embodiments, the user 106 of the second computing device 104 can initiate a session setup process by communicating a session setup request from the second computing device 104 to the first computing device 102. Further, an identifier of the second computing device 104 and/or the user 106 may be sent along with the session setup request to the first computing device 102. Examples of the identifier include a login identifier (ID), a password, a device ID, a user ID, and so forth for uniquely identifying the second computing device 104 and the user 106.

Further, the first computing device 102 and the second computing device 104 can communicate or exchange data, such as via messages, with each other while the computing devices 102 and 104 are within a communication range, or generally a predetermined distance, from each other. The communication range can depend on the particular wireless communication technology being used. For example, the communication range for NFC technologies may be 10 cm or less. Therefore, the second computing device 104 can send a session setup request to the first computing device 102 when a distance between the first computing device 102 and the second computing device 104 is within the communication range.

The first computing device 102 can authorize the user 106 and/or the second computing device 104 based on the identifier. In an exemplary scenario, the first computing device 102 may authorize the user 106 and/or the second computing device 104 based on a digital certificate service. If the identifier verified as correct, the first computing device 102 may subsequently authorize the user 106 and/or the second computing device 104 and allow access to the first computing device 102 by establishing a service session between the first computing device 102 and the second computing device 104. When the identifier is not correct or verified, the first computing device 102 may disallow the user 106 and the second computing device 104 from accessing the first computing device 102.

Post authorization, the first computing device 102 may send a platform hardware signal for displaying one or more operation options to the second computing device 104. In some embodiments, the operation option(s) are displayed at the second computing device 104 via a display. The operation options may be displayed based on a privilege level of the user. For example if the user 106 has an "admin" privilege level then all the available operation options can be displayed at the second computing device 104. If the user 106 has normal privileges, then a subset of operation options is displayed to the user 106. The displayed operation options may allow the user 106 to control one or more functionalities or perform one or more operation on the first computing device 102. In some embodiments, the options may be displayed on a display device associated with the second computing device 104. Examples of the display device may include, but are not limited to, a display of television, a laptop, a computer, a mobile phone, a projection screen, and the like.

Further, the user 106 can be authorized to provide service instructions based on his or her privilege level. The user 106 may select one of the operation options and may provide one or more service instructions at the second computing device 104. Examples of the service instructions may include, but are not limited to, instructions for hardware jumper impersonation to use the first computing device 102 such as a server, as baseline and deploy any server settings (for example, software or hardware) across similar servers, instructions for showing current system health status by capturing server heartbeat, light emitting devices (LEDs), BMC event status, and the like summary to connect to live customer support sites based on events captured.

One or more operations may be performed at the first computing device 102 based on the service instructions and the selection of the one or more operation options by the user 106. Examples of the operations include, but are not limited to, move a juniper to the backup bank of firmware, assert physical presence to perform security actions on the security chip, reset firmware defaults of the first computing device 102, change some firmware settings of the first computing device 102, maintenance operation, recovery operation, and the like.

Further, service instructions may be stored for future use. In some embodiments, the service instructions are stored at the first computing device 102. In alternative embodiments, the service instructions may be stored at the second computing device 104. In further embodiments, the service instructions may be stored at a device or memory in a cloud computing network (See FIG. 7 for example).

It is noted that service instructions or service data may be grouped into settings that apply to multiple servers and/or another set which are server specific. This may be used to present a user with a choice to apply common settings across all alike or similar servers as a service technician moves through a datacenter.

Figure 2:
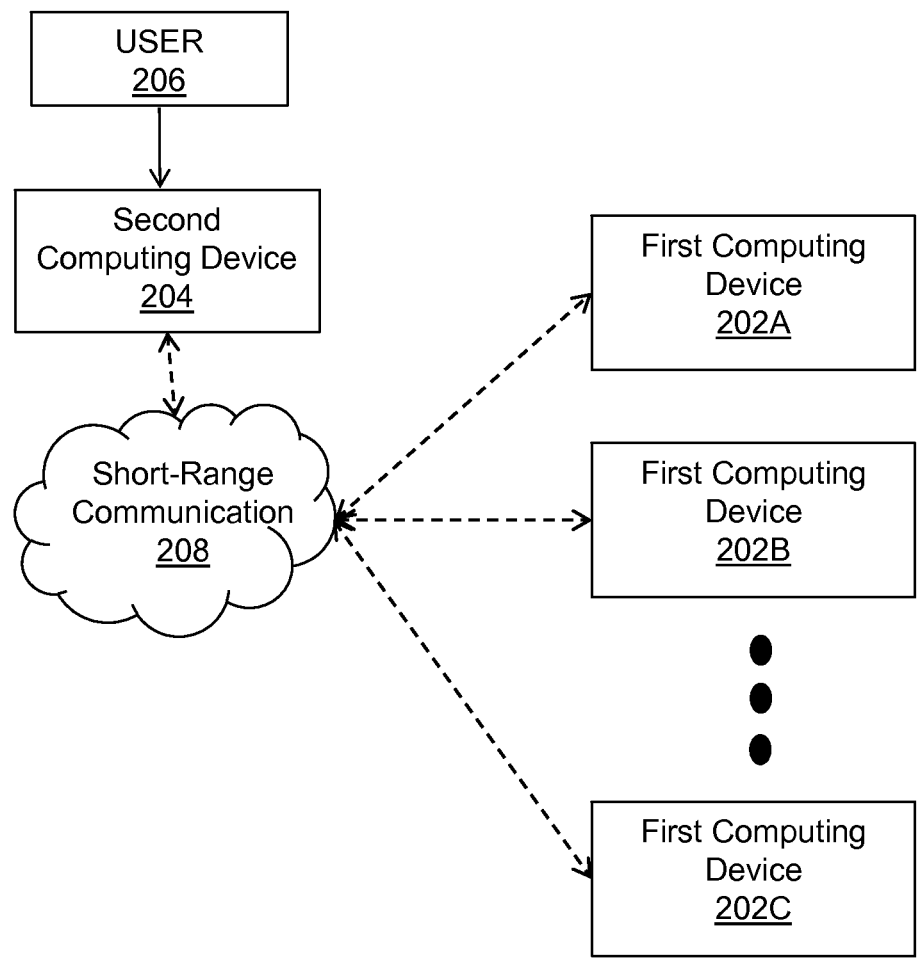
FIG. 2 is a block diagram depicting an exemplary environment including multiple first computing devices in accordance with an embodiment of the present disclosure.

FIG. 2 illustrates a block diagram depicting an exemplary environment 200 including first computing devices 202A-202N in accordance with an embodiment of the present disclosure. The environment 200 includes the first computing devices 202A-202N, a second computing device 204, and an associated user 206 of the second computing device 204. Each of the first computing devices 202A-202N can be similar in functionality and structure to the first computing device 102 of FIG. 1. Similarly, the second computing device 204 may be similar in structure and functionality to the second computing device 104 of FIG. 1. As discussed with reference to FIG. 1, the user 206 can initiate a session from the second computing device 204. The second computing device 204 may send a service session setup request and an identifier of the second computing device 204 and the user 106 to one or more first computing device, such as the first computing devices 202A-202N. The identifier may include a user identifier, a password, a device identifier, or the like. The first devices 202A-202N may authorize the user 206 and the second computing device 204 based on the identifier. In an exemplary scenario, the first computing devices 202A-202N may authorize the user 206 and/or the second computing device 204 based on a digital certificate service.

The second computing device 204 may be configured to establish multiple sessions with multiple first computing devices 202A-202N post authorization via short-range communication 208 (e.g., NFC). The second computing device 204 can receive platform hardware signals from the first computing devices 202A-202N post authorization for displaying operation options at the second computing device 204.

The user 206 may also provide one or more service instructions that are allowable based on a privilege level of the user 206 and/or the second computing device 204 at the second computing device 204. Based on the service instructions, one or more operations may be performed at one or more of the first computing devices 202A-202N. The service instructions may be stored at the first computing devices 202A-202N for future use. In alternative embodiments, the instructions may be stored in a memory present within a cloud computing device (See e.g., FIG. 7). In further, embodiments, the service instructions may be stored at the second computing device 204.

Further, in some embodiments, the user 206 may provide standard instruction for all of the first computing devices 202A-202N. In alternative embodiments, the user 206 may provide specific instruction for a subset of the first computing devices 202A-202N. Further, the user 206 may set up multiple sessions with multiple first computing devices 202A-202N, with an ability to transparently reconnect and refresh state of the one or more of the first computing devices 202A-202N as the user 206 walks away from one of the first computing devices 202A-202N. When the user 206 carrying the second computing device 204 walks away and farther than a predetermined distance from one of the first computing devices 202A-202N, the session between the second computing device 204 and the first computing devices 202 may terminate.

Examples of the service instructions may include, but are not limited to, instructions for hardware jumper impersonation to use the first computing device such as a server, as baseline and deploy any server settings (for example, software or hardware) across similar servers, instructions for showing current system health status by capturing server heartbeat, light emitting devices (LEDs), and BMC event status summary to hook into live customer support sites based on events captured. In some embodiments, the user 206 such as the service technician or customer may leverage an NFC tag, either a badge, or mobile device, carried by the user 206 to instigate the recovery mechanism or operations.

As the first computing devices 202A-202N are similar in structure and functionality, hence hereinafter they may collectively be referred as first computing devices 202.

One or more operations may be performed at one or more of the first computing devices 202 based on the service instructions. Examples of the operations may include, but are not limited to, move a jumper to the backup bank of firmware, assert physical presence to perform security actions on the security chip, reset firmware defaults of the first computing devices 202, change some firmware settings of the first computing devices 202, maintenance operation, recovery operation, and the like.

Figure 3:
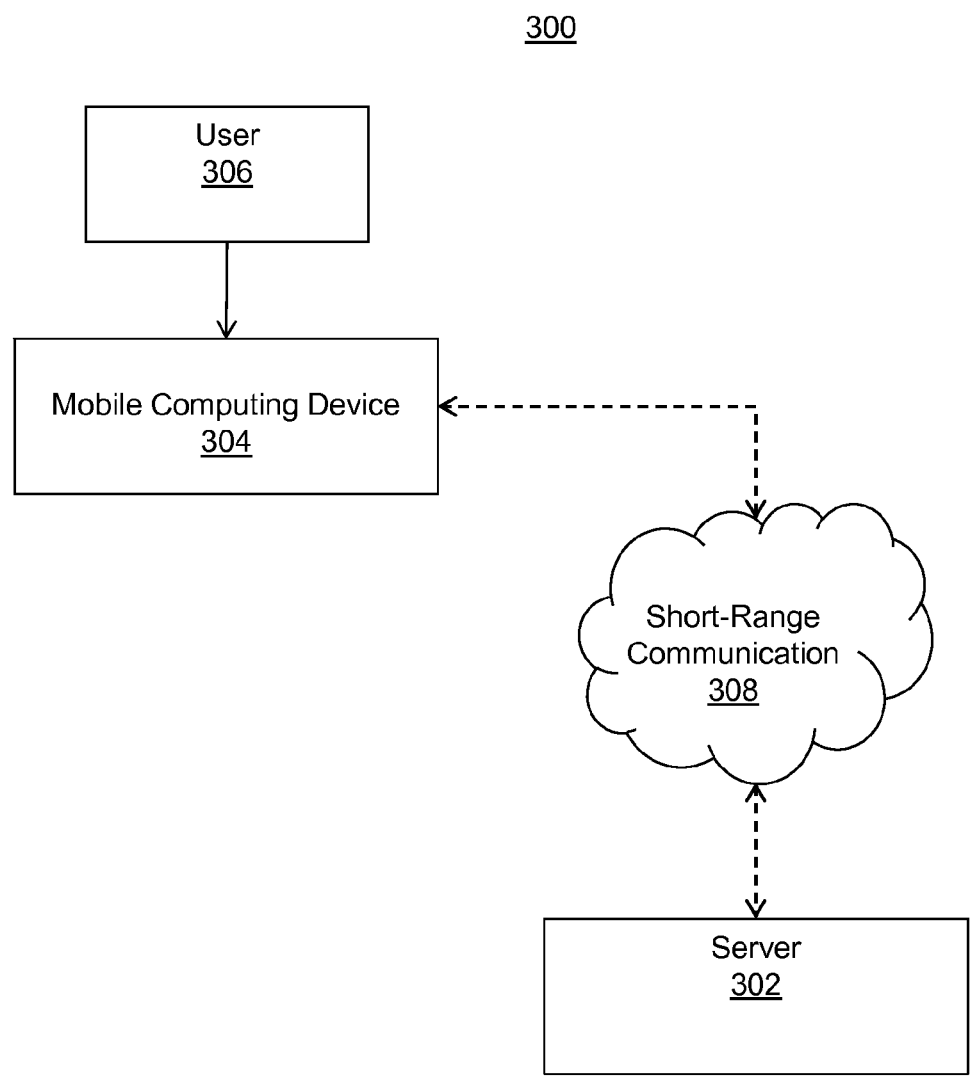
FIG. 3 is a schematic diagram of another exemplary environment in accordance with another embodiment of the present disclosure.

FIG. 3 illustrates a block diagram illustrating another exemplary environment 300 in accordance with another embodiment of the present disclosure. As discussed with reference to FIG. 1, the first computing device 102 can be a server 302, and the second computing device 104 can be a mobile computing device 304 as shown in FIG. 3. The mobile computing device 304 can be a mobile phone, smart phone, a badge, a chip, a chip based credit card, an identity card, or the like. The mobile computing device 304 may be registered with the server 302 for accessing one or more functions of the server 302. A user 306 for accessing or performing one or more operations on the server 302 may use the mobile computing device 304. A service session setup request may be sent to the server 302 from the mobile computing device 304 along with an identifier of the mobile computing device 304 and the user 306. The mobile computing device 304 may connect to the server 302 via a short-range communication 308, such as NFC, and send a service session setup request to the server 302. The server 302 may also receive an identifier of the mobile computing device 304 and/or the user 306.

In an exemplary scenario, the user 306 may initiate a service session setup request with a BMC of the server 302. The BMC may authenticate and authorize the user 306 and the mobile computing device 304 via a digital certificate or similar techniques over the short-range communication 308. For example, NFC may be utilized. Once authenticated, the BMC may share platform hardware signal information over NFC with the mobile computing device 304 to display one or more user choices or operation options at the mobile computing device 304. The user choices or operation options may be displayed based on a privilege level of the user 306 and/or the mobile computing device 304. The operation options or the user choices present the user with options corresponding to operations of the server 302 that the user 306 can control through the mobile computing device 304. The privilege level of the user 306 may define a level of access control the user 306 have on the server 302. The operation options may vary depending on specific user privilege level and a specific user may only get a subset of operation options based on the privilege level.

Further, the user 306 may select one of the operation options and/or provide specific service instructions for the server 302 via the NFC. Example service instructions include, but are not limited to, instructions for hardware jumper impersonation to use the server 302, as baseline and deploy any server settings (for example, software or hardware) across similar servers, instructions for showing current system health status by capturing server heartbeat, light emitting devices (LEDs), and BMC event status etc. summary to hook into live customer support sites based on events captured. In alternative embodiments, the user 306 may provide standard instructions for more than one server 302.

Based on the received service instructions, one or more operations may be performed at the server 302. Examples operation include, but are not limited to, move a jumper to the backup bank of firmware, assert physical presence to perform security actions on the security chip, reset firmware defaults of the mobile computing device 304, change some firmware settings of the mobile computing device 304, and the like.

Figure 4:
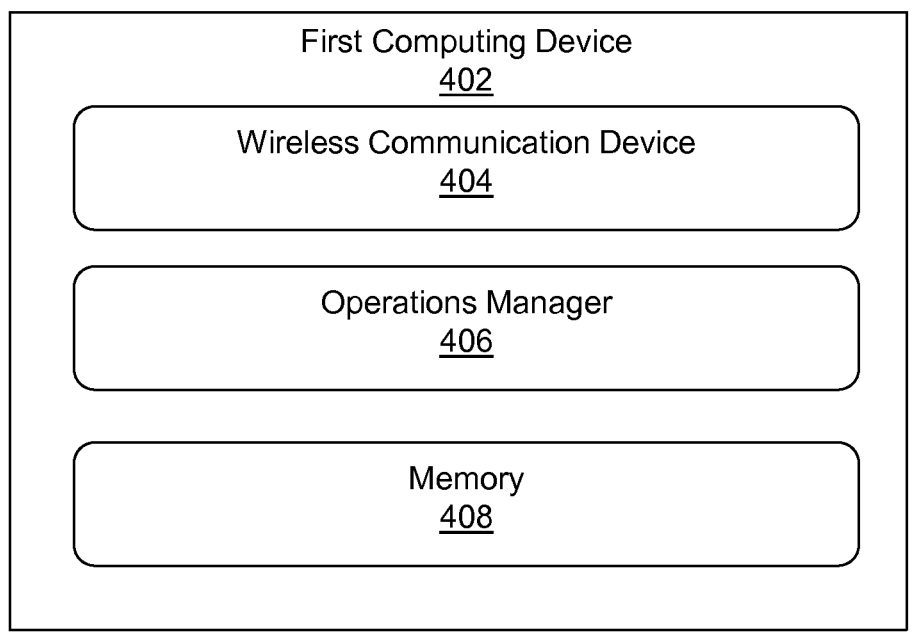
FIG. 4 is a block diagram of various system elements of an exemplary first computing device in accordance with an embodiment of the present disclosure.

FIG. 4 is a block diagram 400 illustrating system elements of a first computing device 402, in accordance with an embodiment of the present disclosure. The first computing device 402 may include a wireless communication device 404, an operations manager 406, and a memory 408. As discussed with reference to FIG. 1, the user 106 may send the service session setup request to the first computing device 102 (or the first computing device 402) from the second computing device 104 via the short-range communication 108, such as NFC.

The wireless communication device 404 may be configured to receive a service session setup request from the second computing device 104 over the short-range communication 108. The wireless communication device 404 may also be configured to receive an identifier of the second computing device 104 and the user 106, from the second computing device 104 via the short-range communication 108.

The operations manager 406 may be implemented by software, hardware, firmware, or combinations thereof. For example, the operations manager 406 may include one or more processors and memory. The operations manager 406 may be configured to determine whether to authorize the service session setup request based on the identifier. In response to determining to authorize the service session setup request, the operations manager 406 may be configured to establish a service session between the first computing device 402 and the second computing device 104. In some embodiments, the operations manager 406 is configure to setup a session of the first computing device 102 with more than one second computing device 104. In an exemplary scenario, the operations manager 406 may authorize the user 106 and/or the second computing device 104 based on a digital certificate service.

The operations manager 406 may also be configured to receive one or more service instructions that are allowable based on the identifier. The identifier may include, for example, a user ID, device ID, login ID, password, or the like. The operations manager 406 may also be configured to perform one or more operations based on the one or more service instructions at the first computing device 402. The one or more operations may include operation on jumpers' impersonation, and so forth. Further examples of the operations may include, but are not limited to, move a jumper to the backup bank of firmware, assert physical presence to perform security actions on the security chip, reset firmware delimits of the first computing device 402, change some firmware settings of the first computing device 402, and the like.

The memory 408 may be configured to store and maintain the service instructions and identifier, for example. In some embodiments, the second computing device 104 can access the memory 408 for performing one or more operations on the first computing device 102.

Figure 5:
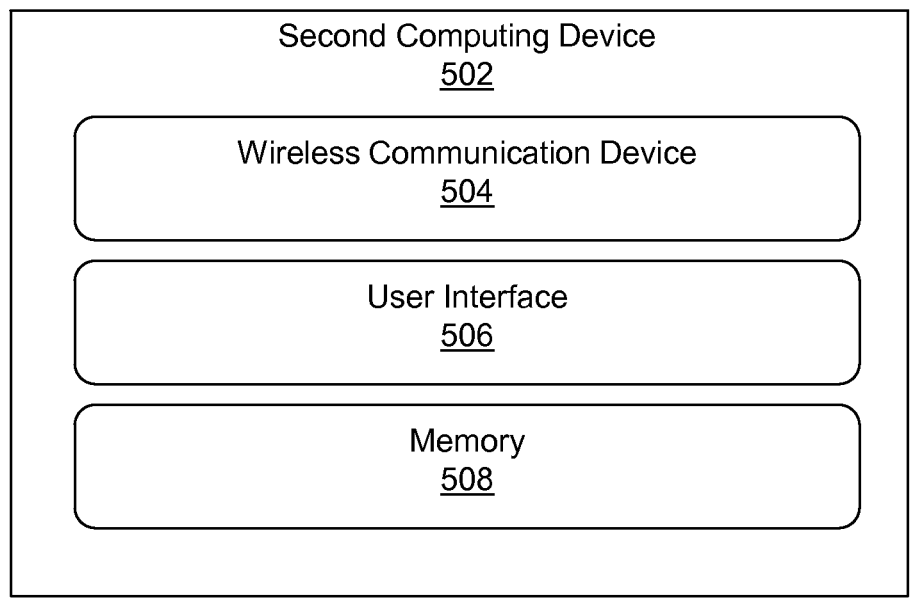
FIG. 5 is a block diagram of various system elements of an exemplary first computing device, in accordance with an embodiment of the present disclosure.

FIG. 5 illustrates a block diagram 500 of system elements of a second computing device 502 in accordance with another embodiment of the present disclosure. As discussed with reference to FIG. 1, the user 106 may send the service session setup request to the first computing device 102 (or the first computing device 402) from the second computing device 104 via short-range communication 108. As shown, the second computing device 502 may include a wireless communication device 504, a user interface 506, and a memory 508.

The wireless communication device 504 is configured to send a session setup request and an identifier of the second computing device 502 and/or a user, such as the user 106 of the second computing device 502. In some embodiments, the wireless communication device 504 may be configured to send the service session setup request and the identifier via short-range communication 108.

The wireless communication device 504 may also be configured to receive an authorization for a service session with the first computing device 102 (or 402). The wireless communication device 504 may also be configured to receive platform hardware signal information from the first computing device 102. The first computing device 102 (or 402) may communicate the platform hardware signals to the second computing device 502 post authorization.

In response to receiving the authorization for the service session with the first computing device 102, the wireless communication device 504 may send one or more service instructions that are allowable based on the identifier to the first computing device 102. The user 106 can provide the instructions at the second computing device 502 based on a privilege level of the user 106 and/or the second computing device 502. For example, if the user 106 has an admin privilege level, the user 106 can control the first computing device 102 completely. The user interface 506 may allow the user 106 to enter the one or more service instructions or select one or more service instructions at the second computing device 502.

The memory 508 may store and maintain service instructions, identifier, device ID, and information of the user 106 (e.g., user ID). The user 106 can use the stored service instructions for performing one or more operations at the first computing device 102.

Figure 6A:
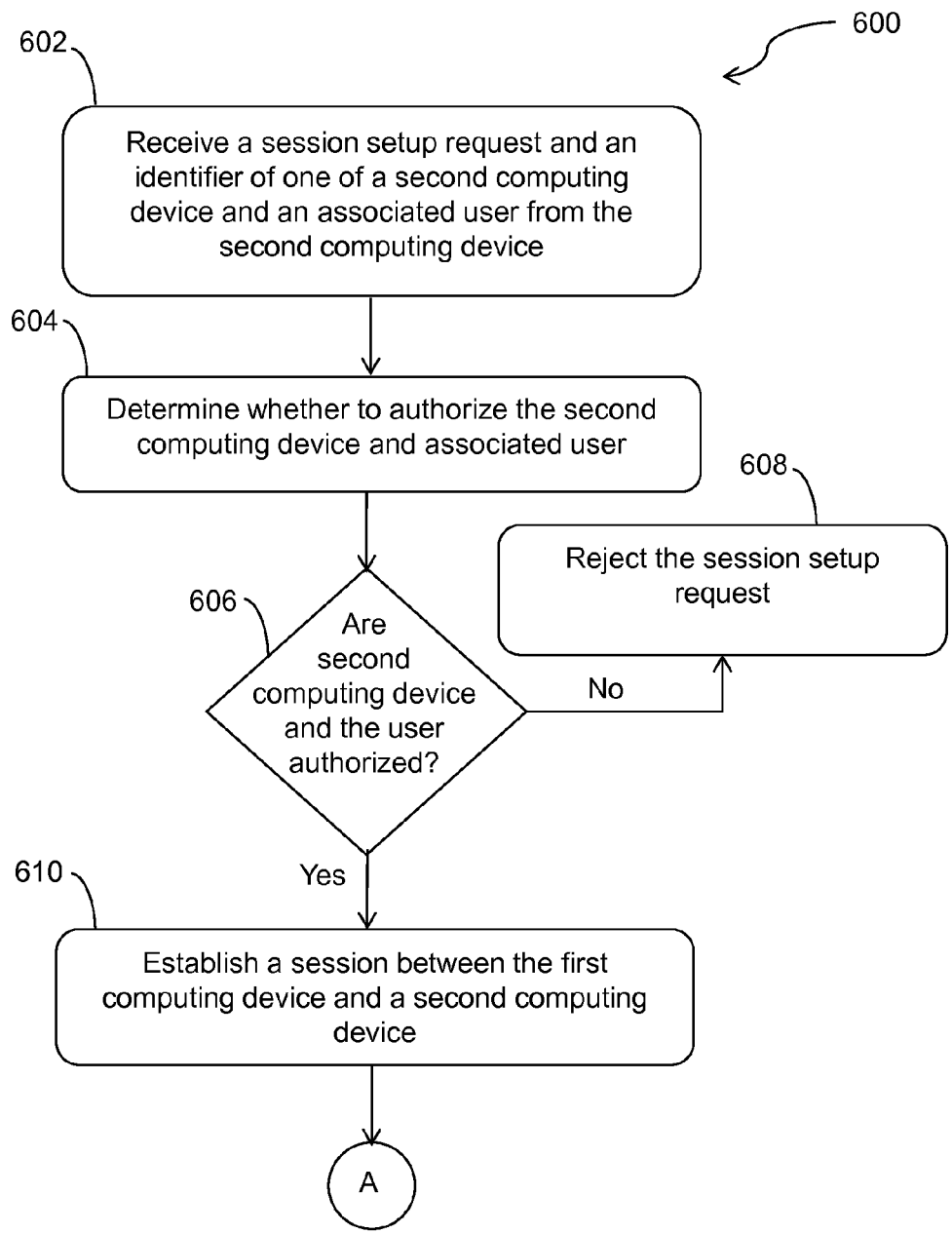
FIGS. 6A-6C is a flowchart of an exemplary method for performing one or more operations on a first computing device in accordance with an embodiment of the present disclosure.
Figure 6B:
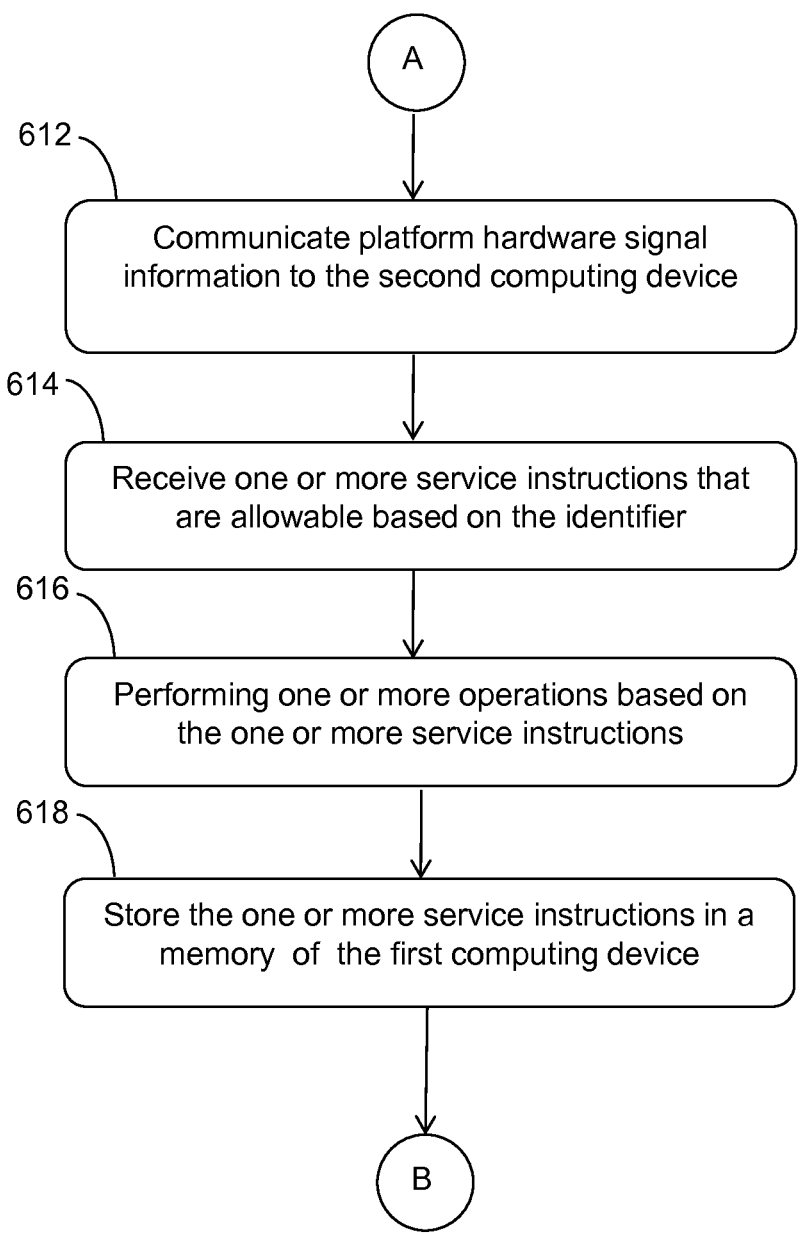
Figure 6C:
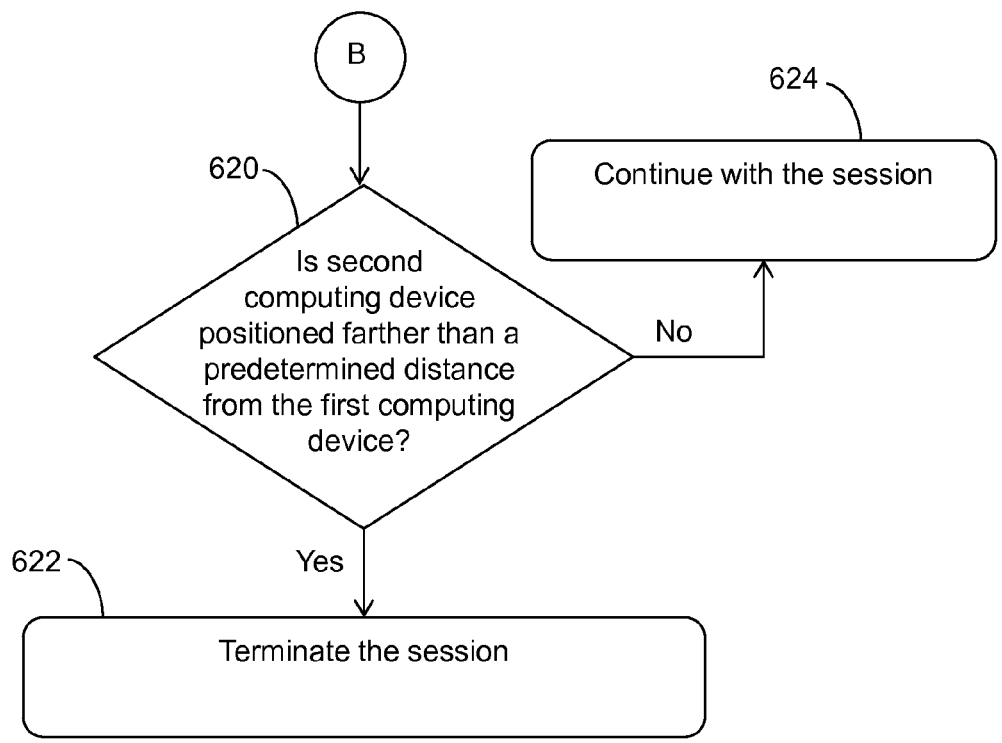

FIGS. 6A-6C illustrates a flowchart of an exemplary method 600 for performing one or more operations at a first computing device in accordance with embodiments of the present disclosure. The example method may be implemented by a system such as the system depicted in the example of FIG. 1. Reference is made to the system of FIG. 1, but it should not be construed as limiting.

Referring to FIG. 6A, the method includes receiving 602 a session setup request and an identifier of one of a computing device and an associated user from the computing device. For example in FIG. 1, the user 106 can initiate a session by sending a session setup request to the first computing device 102 (or 402) via short-range communication 108. The session setup request may be sent from the second computing device 104 (or 502) via short-range communication 108.

The method includes determining 604 whether to authorize the computing device and associated user. Continuing the aforementioned example, a session setup request and an identifier of one of the second computing device 502 and the user 106 may be received from the second computing device 502. In some embodiments, the wireless communication device 404 of the first computing device 402 may receive the session setup request and the identifier. Further, the first computing device 402 and the second computing device 502 can communicate with each other until when both the first computing device 402 and the second computing device 502 are within a predetermined distance from each other, which may be the range of wireless communication between the devices. Therefore, the second computing device 502 can send a session setup request to the first computing device 402 when a distance between the first computing device 402 and the second computing device 502 is equal to or less than the predetermined distance.

At step 606, the method includes determining whether the computing device and user are authorized. Continuing the aforementioned example of FIG. 1, it is determined whether to authorize the second computing device 502 and the user 106 or not. In some embodiments, the operations manager 406 determines whether to authorize the second computing device 502 and the user 106 or not based on the identifier. At step 606, it is checked whether the second computing device 502 and the user 106 are authorized or not. If so, the method proceeds to step 610. Otherwise, the method proceeds to step 608. At step 608, the method include rejecting the session setup request. For example, the second computing device 502 may be notified about the rejection of the session setup request.

At step 610, the method includes establishing a session between the first computing device and a second computing device. Continuing the aforementioned example of FIG. 1, a session may be established between the first computing device 402 and the second computing device 502. In some embodiments, the operations manager 406 may establish the session between the first computing device 402 and the second computing device 502. At step 612, the method includes communicating platform hardware signal information to the second computing device (see FIG. 6B). For example, the first computing device 402 communicates platform hardware signal information to the second computing device 502. In some embodiments, the wireless communication device 404 communicates the platform hardware signal information to the second computing device 502.

At step 614, the method includes receiving one or more service instructions that are allowable based on the identifier. Continuing the aforementioned example, the first computing device 402 may receive one or more service instructions that are allowable based on the identifier of the second computing device 502 and the user 106. In some embodiments, the operations manager 406 receives one or more service instructions from the second computing device 502. Examples of the service instructions may include, but are not limited to, instructions for hardware jumper impersonation to use the first computing device 402 such as a server, as baseline and deploy any server settings (for example, software or hardware) across similar servers, instructions for showing current system health status by capturing server heartbeat, LEDs, and BMC event status summary to hook into live customer support sites based on events captured.

Thereafter, at step 616, the method include performing one or more operations based on the one or more service instructions. Continuing the aforementioned example, one or more operations are performed at the first computing device 402 based on the one or more service instructions. In some embodiments, the operations manager 406 performs the operations at the first computing device 402 based on the service instructions received from the second computing device 502. Examples of the operations may include, but are not limited to, move a jumper to the backup bank of firmware, assert physical presence to perform security actions on the security chip, reset firmware defaults of the first computing device 402, change some firmware settings of the first computing device 402, and the like.

At step 618, the method includes storing the service instruction(s) in a memory of the first computing device. Continuing the aforementioned example, one or more service instructions may be stored in the memory 408 of the first computing device 402. These instructions may be used later for performing one or more operations on the first computing device 402 or at multiple first computing devices 202A-202N.

At step 620, the method includes determining whether the second computing device is positioned farther than a predetermined distance from the first computing device. If the second computing device is positioned farther than the predetermined distance from the first computing device, the session terminates at step 622. Otherwise, the session proceeds to step 624. Continuing the aforementioned example, the operations manager 406 may determine and check whether the second computing device 502 is positioned farther than a predetermined distance from the first computing device 402. In an exemplary scenario, the predetermined distance is 30 cm, 10 inches, and or any other suitable distance.

Figure 7:
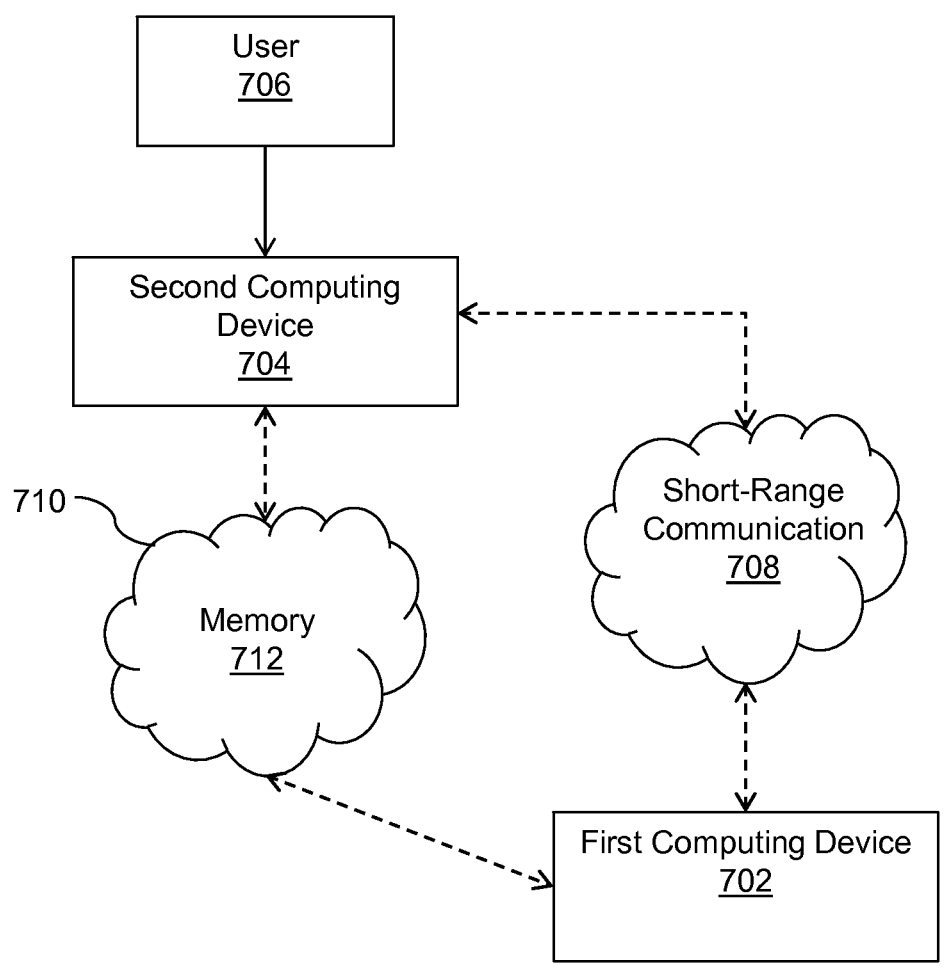
FIG. 7 is a schematic diagram of an exemplary environment in accordance with an embodiment of the present disclosure.

FIG. 7 illustrates a block diagram of an exemplary environment 700 in accordance with an embodiment of the present disclosure. Referring to FIG. 7, the environment 700 includes a computing device 702, another computing device 704 and its associated user 706, a cloud computing network 710 including a memory 712. The first computing device 702 may be similar in structure and functionality to the first computing device 102 shown in FIG. 1 and the first computing device 402 shown in FIG. 4. Similarly, the second computing device 704 may be similar in structure and functionality to the first computing device 102 of FIG. 1 and the second computing device 502 of FIG. 5.

The user 706 can provide one or more instructions to the first computing device 702 post establishment of a session between the first computing device 702 and the second computing device 704. Examples of the service instructions include, but are not limited to, instructions for hardware jumper impersonation to use the first computing device 702 such as a server, as baseline and deploy any server settings (for example, software or hardware) across similar servers, instructions for showing current system health status by capturing server heartbeat, LEDs, and BMC event status summary to hook into live customer support sites based on events captured.

Based on these instructions, one or more operations as described herein may be performed at the first computing device 702. Further examples of the operations include, but are not limited to, move a jumper to the backup bank of firmware, assert physical presence to perform security actions on the security chip, reset firmware defaults of the first computing device 702, change some firmware settings of the first computing device 702, and the like. The instructions may be stored in the memory 712 within the cloud computing network 710. These instructions may be accessed at the first computing device 702 and the second computing device 704 directly from the cloud computing network.

The user 706 can interact with the computing device to save the desired settings or service instructions into the memory 712 of the cloud computing network 710. The user 706 may select the option on the second computing device 704 to apply same settings to other similar first computing devices, such as servers in a datacenter. As user moves around the datacenter to other racks, the second computing device 704 can get server details (details of first computing devices 702) over short-range communication, such as NFC, and then if server is of same type as the first computing device 702, then the second computing device 704 may get the stored settings from the memory 712 of the cloud computing network 710 and then sends it over NFC to the other similar servers.

The disclosed methods and systems may function to quicken service and execution as the user 706 is just walking around the datacenter and the second computing device 704 (for example, the mobile device) is automatically detecting and performing one or more operations on the first computing devices 702.

Figure 8A:
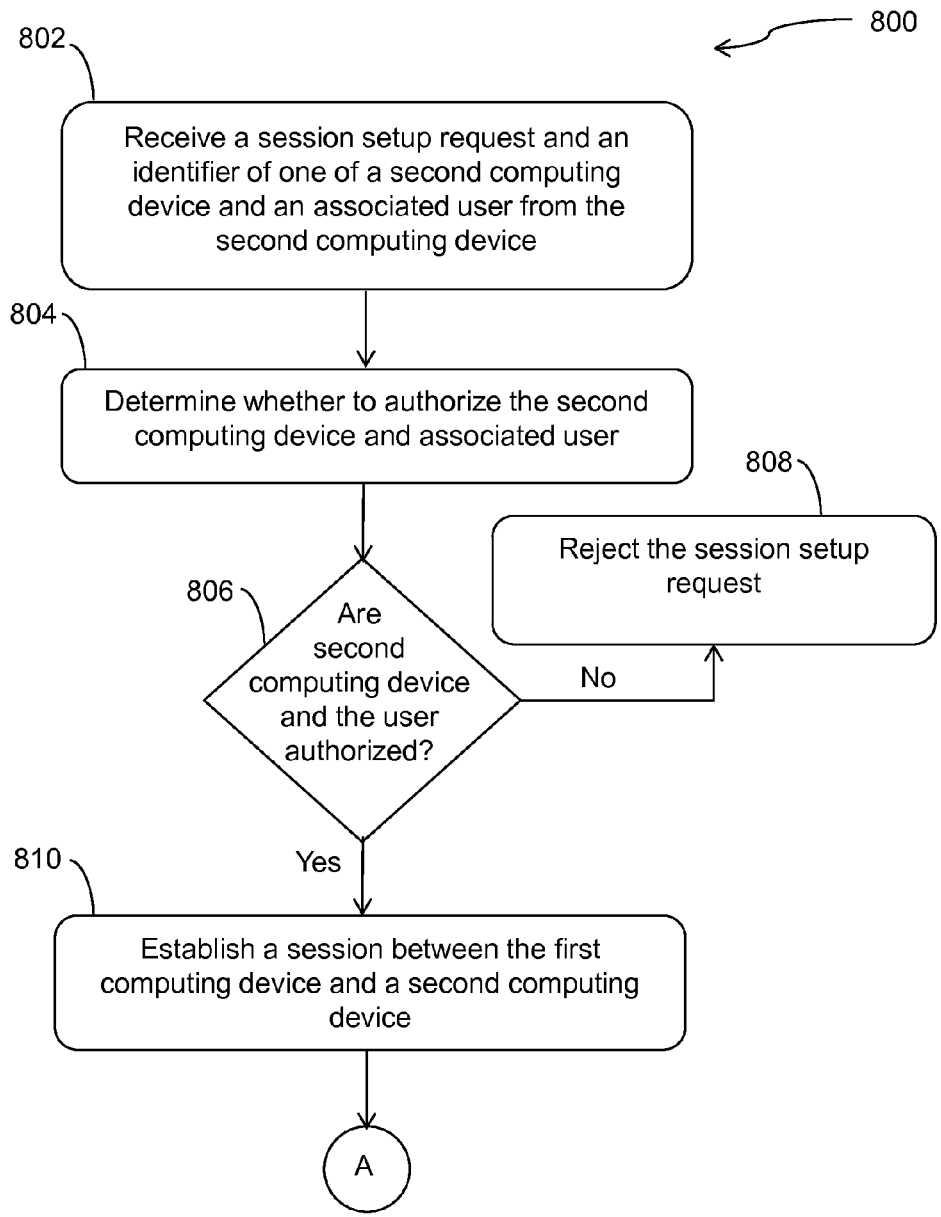
FIGS. 8A-8C is a flowchart of another exemplary method for performing one or more operations on a first computing device in accordance with another embodiment of the present disclosure.
Figure 8B:
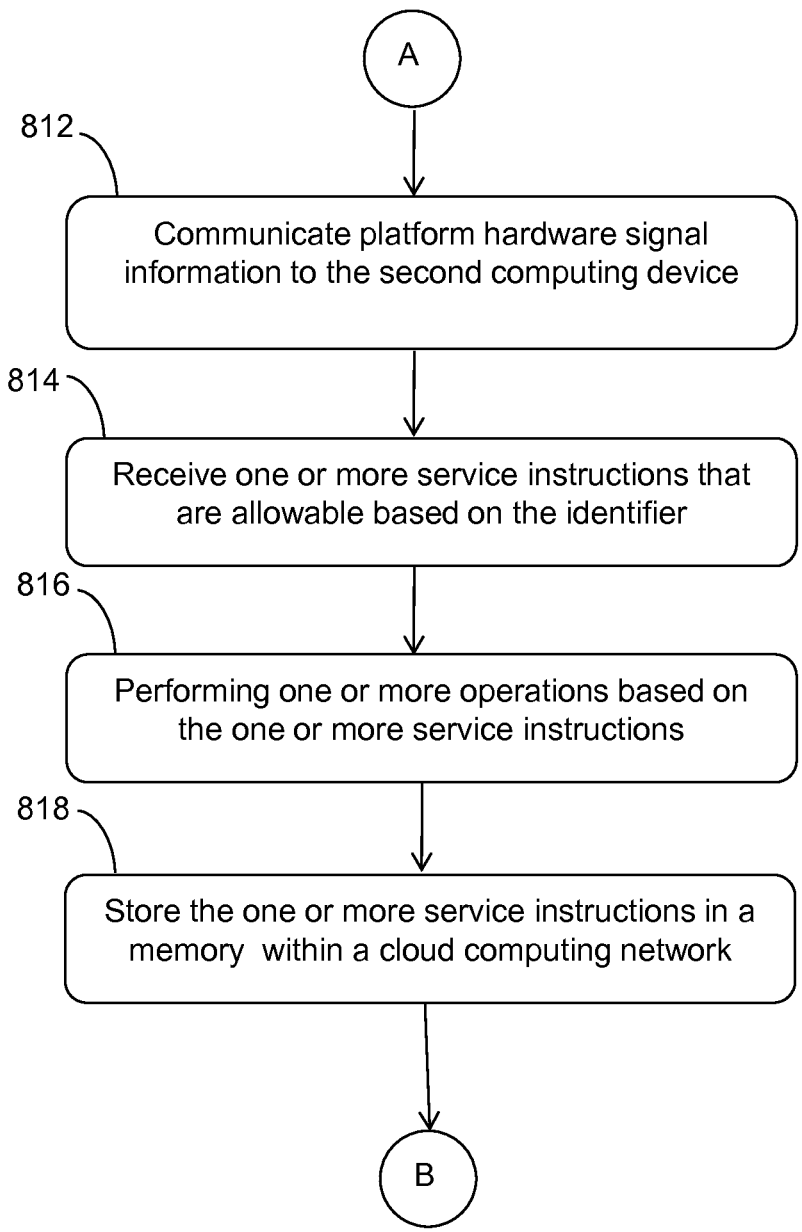
Figure 8C:
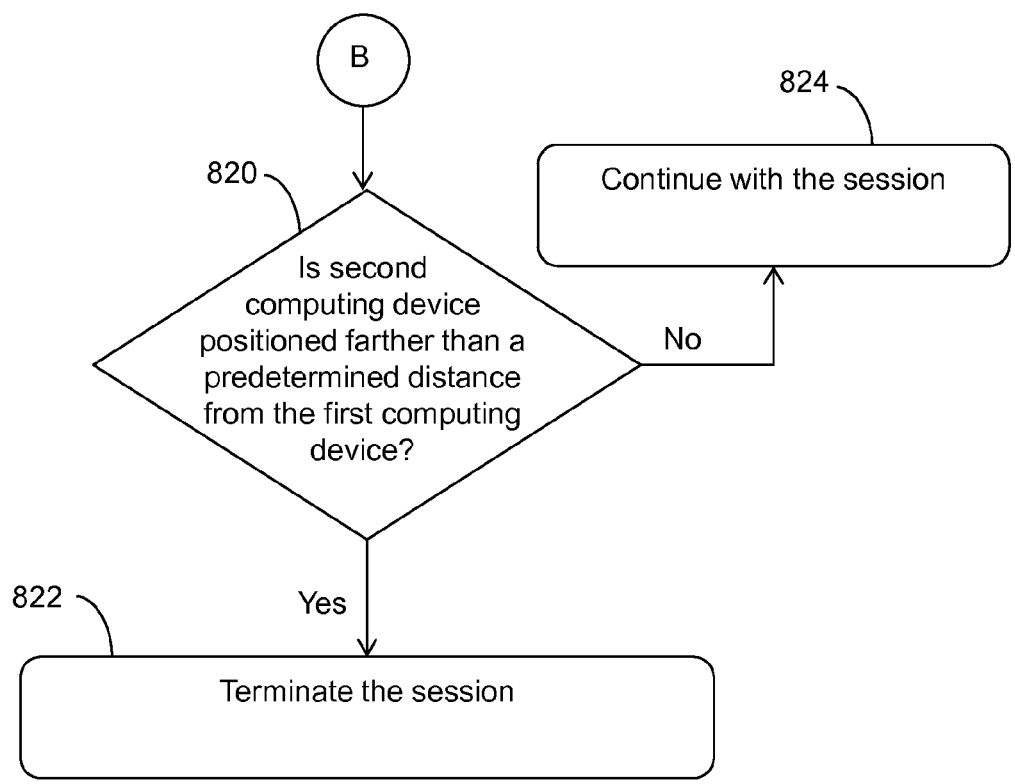

FIGS. 8A-8C illustrates a flowchart of another exemplary method 800 for performing operations at a computing device in accordance with another embodiment of the present disclosure. The example method may be implemented by a system such as the system depicted in the example of FIG. 7. Reference is made to the system of FIG. 7, but it should not be construed as limiting.

Referring to FIG. 8, the method includes receiving 802 a session setup request and an identifier of one of a computing device and an associated user from the computing device. For example, referring to FIG. 7, the user 706 can initiate a session by sending a session setup request to the first computing device 702 (or 402) via short-range communication. Further, a session can be initiated only when the second computing device 704 is at a predetermined distance from the first computing device 702. In some embodiments, the session may be initiated by touching the second computing device 704 with the first computing device 702. The session setup request may be sent from the second computing device 704 (or 502) via the short-range communication 708.

At step 802, a session setup request and an identifier of one of the second computing device 704 and the user 706 are received from the second computing device 704. In some embodiments, the wireless communication device 404 of the first computing device 702 receives the session setup request and the identifier. The session setup request may be received at the first computing device 702 from the second computing device 704 (or 502) via the short-range communication for example, NFC. Therefore, the session setup request can be sent only when the second computing device 704 is in close proximity or within the predetermined distance from the first computing device 702.

At step 804, the method includes determining whether to authorize the second computing device and associated user. Continuing the aforementioned example, it is determined whether to authorize the second computing device 704 and the user 706 or not. In some embodiments, the operations manager 406 may determine whether to authorize the second computing device 702 and/or the user 706. In an exemplary scenario, the operations manager 406 may authorize the user 706 and/or the second computing device 702 based on a digital certificate service.

At step 806, the method includes determining whether the second computing device and the user are authorized. In the example, it is checked whether the second computing device 704 and the user 106 are authorized or not. If yes, the method includes establishing a session between the computing device and a second computing device (step 810). Otherwise, the method includes rejecting 808 the session setup request. In the example, the second computing device 704 may be notified about the rejection of the session setup request.

As an example of step 810, a session may be established between the first computing device 702 and the second computing device 704. In some embodiments, the operations manager 406 may establish the session between the first computing device 702 and the second computing device 704. Subsequently, at step 812 shown in FIG. 8B, the method includes communicating platform signal information to the second computing device. Continuing the aforementioned example, the first computing device 702 may communicate platform hardware signal information to the second computing device 704. In some embodiments, the wireless communication device 404 may communicate the platform hardware signal information to the second computing device 704.

At step 814, the method includes receiving one or more service instructions that are allowable based on the identifier. Continuing the aforementioned example, the first computing device 702 receives one or more service instructions that are allowable based on the identifier of the second computing device 704 and the user 706. In some embodiments, the operations manager 406 receives service instructions from the second computing device 704.

At step 816, the method include performing one or more operations based on one or more service instructions. Continuing the aforementioned example, one or more operations may be performed at the first computing device 702 based on the one or more service instructions. In some embodiments, the operations manager 406 performs the operations at the first computing device 702 based on the service instructions received from the second computing device 704.

At step 818, the method includes storing the one or more service instructions in a memory within a cloud computing network. Continuing the aforementioned example, the one or more service instructions are stored in the memory 712 of the cloud computing network 710. These instructions may be used in future for performing one or more operations on the first computing device 702 or at multiple first computing devices 202A-202N.

At step 820, the method includes determining whether the second computing device is positioned farther than a predetermined distance from the first computing device. Continuing the aforementioned example, it is checked whether the second computing device 704 is positioned farther than a predetermined distance from the first computing device 702. If yes, the session may terminate at step 822. Otherwise, the session continues at step 824. The operations manager 406 may determine and check whether the second computing device 704 is positioned farther than a predetermined distance from the first computing device 702.

Embodiments of the present disclosure may allow a user to create a set of desired settings or service instructions and apply the settings and service instructions same way to multiple first computing devices such as, servers in the datacenter. In some embodiments, memory on the second computing device, such as a mobile device, is less and so the disclosed methods allow the user to access to a cloud based server or memory of a cloud computing network through their mobile device.

The disclosed methods and systems allow the user to save the desired settings into the memory of the cloud computing network. Then if the user so desires he/she may select the option on the mobile device (second computing device) to apply same settings to other similar servers in a datacenter. As user moves around the datacenter to other racks, the mobile device can get server details over short-range communication, such as NFC, and then if server is of same type as the first server it gets the stored settings from the memory of the cloud computing network and then sends it over NFC to the other similar servers.

The disclosed methods and systems for performing one or more operations on the first computing device may speed up service and execution as the user is just walking around the datacenter and the second computing device is automatically detecting and performing one or more operations on the first computing devices i.e. the servers.

An aspect of the present disclosure allows an authorized service technician to perform one or more operations from the front of the chassis of a server. Using Near Field Communication (NFC), the service technician or customer may leverage an NFC tag (either badge, or mobile device) to instigate the recovery mechanism or perform one or more operations on the server.

According to embodiments of the present disclosure, a jumper may be returned to its original position once a maintenance function is complete (thereby potentially requiring the server be disconnected or de-racked again), potentially needing to locate a key to unlock a locked chassis, and accounting for any alarms that may be registered once a chassis is opened (due to an intrusion switch) or once the server goes offline (due to network monitoring).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++, Objective C, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for performing one or more operation on a first computing device, the method comprising:
   receiving, from a second computing device via wireless communication, a request to setup a service session and an identifier of one of the second computing device and an associated user of the second computing device;
   determining, by a processor of the first computing device, whether to authorize the request to setup the service session based on the identifier;
   in response to the determination that the request to setup the service session is authorized:
      establishing, by the processor of the first computing device, the service session between the first computing device and the second computing device, responsive to detecting that a distance between the first computing device and the second computing device is equal to or less than a predetermined distance;
      displaying, by the second computing device, options for the one or more operations according to a predetermined privilege level of the associated user of the second computing device;
      receiving, by the processor of the first computing device and from the second computing device, one or more service instructions that are allowable based on the identifier and the predetermined privilege level;
      performing, by the processor of the first computing device, the one or more operations based on the one or more service instructions and a selection from the displayed options by the associated user of the second computing device;
      storing, by the second computing device, the one or more service instructions in a remote computing network;
   transparently reconnect and refresh a computing state of the first computing device based on a distance between the first computing device and the second computing device;
   obtaining, by the second computing device, the one or more service instructions stored in the remote computing network upon verifying that device type information of another computing device matches device type information of the first computing device.

2. The method of claim 1, wherein the first computing device is a server, and the second computing device is a mobile computing device.

3. The method of claim 1, wherein the remote computing network is a cloud computing network.

4. The method of claim 1, further comprising communicating platform hardware signal information to the second computing device in response to the determination that the request to setup the service session is authorized.

5. The method of claim 1, wherein the wireless communication is Near Field Communication (NFC).

6. The method of claim 1, further comprising receiving, at the second computing device, user selection of the one or more service instructions via a user interface prior to the storing of the one or more service instructions in the remote computing network.

7. The method of claim 1, further comprising:
determining whether the second computing device is positioned farther than a predetermined distance from the first computing device; and
in response to determining that the second computing device is positioned farther than a predetermined distance from the first computing device, terminating the service session.

8. A system for performing one or more operations on a first computing device, the system comprising:
a wireless communication device configured to receive, from a second computing device via wireless communication, a request to setup a service session and an identifier of one of the second computing device and an associated user of the second computing device;
at least one memory storing computer instructions;
at least one processor configured to execute the computer instructions to:
determine whether to authorize the request to setup the service session based on the identifier;
in response to the determination that the request to setup the service session is authorized:
establish the service session between the first computing device and the second computing device, responsive to detecting that a distance between the first computing device and the second computing device is equal to or less than a predetermined distance;
receive one or more service instructions that are allowable based on the identifier and a predetermined privilege level of the user associated with the second computing device in response to the second computing device displaying options for the one or more operations according to the predetermined privilege level of the associated user of the second computing device;
perform the one or more operations based on the one or more service instructions and a selection from the displayed options by the associated user of the second computing device;
wherein the second computing device stores the one or more service instructions in a remote computing network;
transparently reconnect and refresh a computing state of the first computing device based on a distance between the first computing device and the second computing device;
wherein the second computing device obtains the one or more service instructions stored in the remote computing network upon verifying that device type information of another computing device matches device type information of the first computing device.

9. The system of claim 8, wherein the remote computing network is a cloud computing network.

10. The system of claim 8, wherein the wireless communication device is further configured to communicate platform hardware signal information to the second computing device in response to the determination that the request to setup the service session is authorized.

11. The system of claim 8, wherein the wireless communication is Near Field Communication (NFC).

12. The system of claim 8, wherein the processor is further configured to:
determine whether the second computing device is positioned farther than a predetermined distance from the first computing device; and
terminate the service session in response to determining that the second computing device is positioned farther than a predetermined distance from the first computing device.

13. A method for performing one or more operations on a first computing device, the method comprising:
sending, by a processor of a second computing device and to the first computing device via wireless communication, a request to set up a service session and an identifier of one of the second computing device and an associated user of the second computing device;
receiving, by the processor of the second computing device from the first computing device, authorization for the service session with the first computing device;
in response to the authorization for the service session with the first computing device:
establishing, by a processor of the first computing device, a service session between the first computing device and the second computing device, responsive to detecting that a distance between the first computing device and the second computing device is equal to or less than a predetermined distance;
displaying, by the processor of the second computing device, options for the one or more operations based on a predetermined privilege level of the associated user of the second computing device;
sending, by the processor of the second computing device to the first computing device, one or more service instructions that are allowable based on the identifier and the predetermined privilege level;
performing, by the processor of the first computing device, the one or more operations based on the one or more service instructions and a selection from the displayed options by the associated user of the second computing device;
storing, by the processor of the second computing device, the one or more service instructions in a remote computing network;
transparently reconnect and refresh a computing state of the first computing device based on a distance between the first computing device and the second computing device; and
obtaining, by the processor of the second computing device, the one or more service instructions stored in the remote computing network upon verifying that device type information of another computing device matches device type information of the first computing device.

14. The method of claim 13, wherein the remote computing network is a cloud computing network.

15. The method of claim 13 further comprising receiving platform hardware signal information from the first computing device.

16. The method of claim 13, wherein the wireless communication is Near Field Communication (NFC).

17. The method of claim 13, further comprising receiving, via a user interface, selection of the one or more service instructions prior to the storing of the one or more service instructions in the remote computing network.

\* \* \* \* \*